United States Patent [19]

Messner et al.

[11] 3,848,692

[45] Nov. 19, 1974

[54] DUAL BRAKE ON DRIVE AND IDLER WHEELS OF INDUSTRIAL TRUCKS

[75] Inventors: John S. Messner; Robert E. Jones, both of Battle Creek, Mich.

[73] Assignee: Clark Equipment Company, Buchanan, Mich.

[22] Filed: Dec. 26, 1973

[21] Appl. No.: 428,502

[52] U.S. Cl. .............................. 180/52, 188/106 F
[51] Int. Cl. ............................................ B60k 17/30
[58] Field of Search ............ 180/52, 13; 188/106 F, 188/106 P

[56] References Cited
UNITED STATES PATENTS

| | | | |
|---|---|---|---|
| 2,140,040 | 12/1938 | White | 188/106 P |
| 2,262,829 | 11/1941 | Brock | 188/106 P X |
| 3,280,933 | 10/1966 | Jones | 180/52 |
| 3,392,797 | 7/1968 | Gibson | 180/52 |
| 3,525,423 | 8/1970 | Sheiry | 188/106 F |
| 3,722,613 | 3/1973 | DePriester | 180/52 |

*Primary Examiner*—David Schonberg
*Assistant Examiner*—Terrance L. Siemens
*Attorney, Agent, or Firm*—John C. Wiessler

[57] ABSTRACT

A brake system for wheeled vehicles, especially lift trucks having one motorized drive wheel and one idler wheel spaced laterally thereof and adjacent the operator's station. The idler wheel may be either a steered wheel or a caster wheel, but in either construction a brake is associated with both the idler wheel and the drive wheel. The drive-steer wheel is braked by a direct acting mechanical brake which acts on the motor shaft through the transmission gear train in order to minimize operator effort and maximize the use of space in packaging the brake in a relatively small space as compared with a brake-in-wheel construction, while the idler wheel is braked by a hydraulic acting brake device operating in the wheel itself.

10 Claims, 7 Drawing Figures

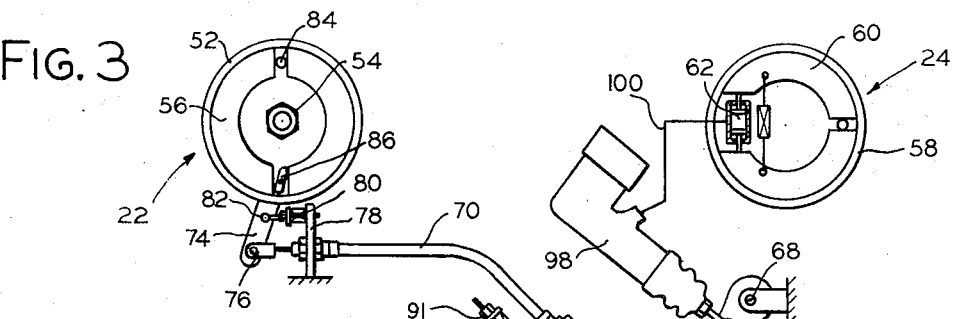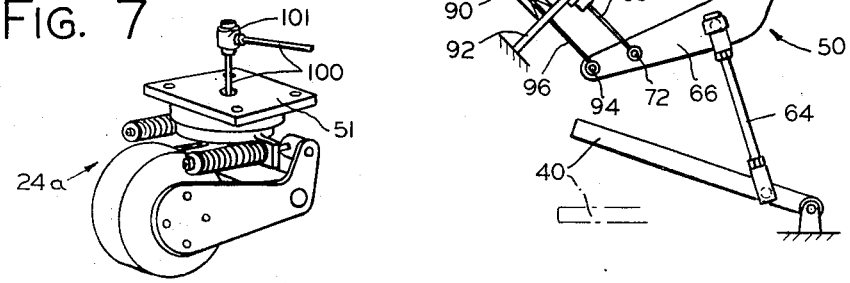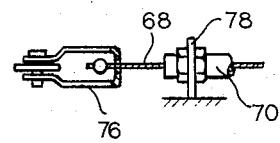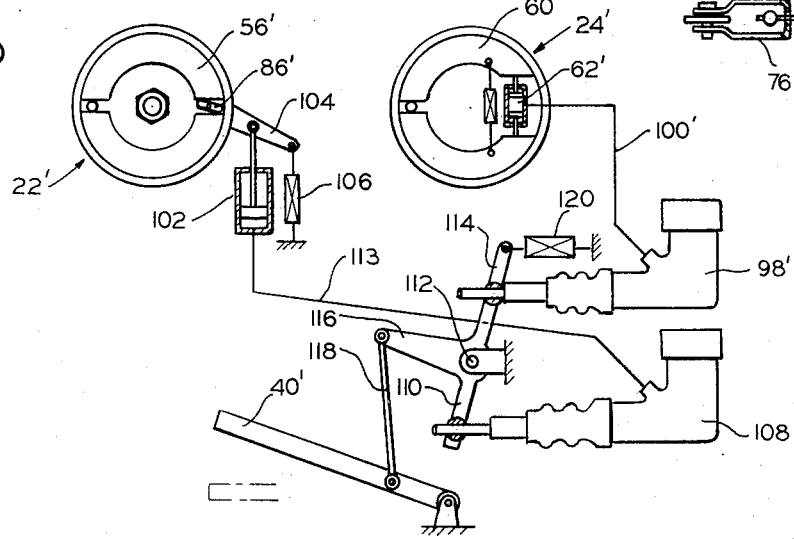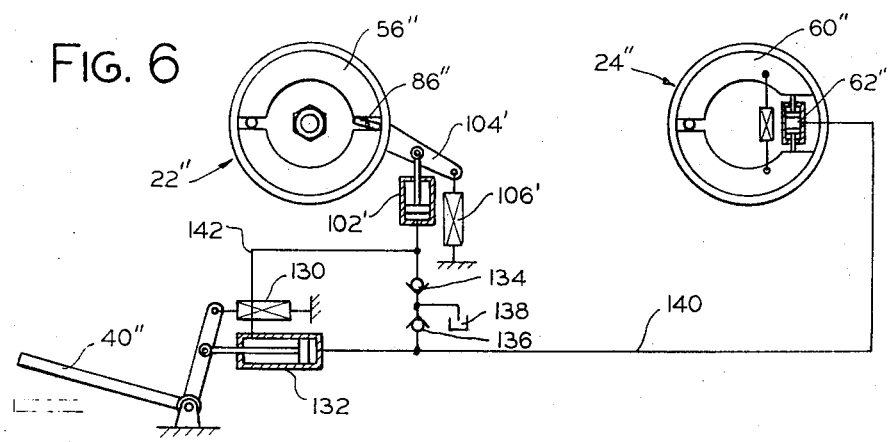

DUAL BRAKE ON DRIVE AND IDLER WHEELS OF INDUSTRIAL TRUCKS

BACKGROUND OF THE INVENTION

This invention relates to a brake system, and more particularly to a brake system for wheeled vehicles in which brake means are provided on both drive and idler vehicle wheels.

It is particularly useful in narrow-aisle industrial lift trucks of wellknown types, one of the more widely accepted types providing a space at the rear of the truck in which the operator is enabled to ride in a stand-up position in a generally U-shaped open operator's station, and wherein the truck is supported by nonpowered wheels at the front or load receiving end of the main frame, and wheels at the rear for driving and steering the truck. For a variety of reasons, various constructions have been heretofore designed, such as are represented in U.S. Pat. Nos. 2,564,002; 3,080,019; 3,163,250; and 3,280,933.

In U.S. Pat. No. 2,564,002 a single off-center dirigible drive wheel having the sole braking means for the truck, and a laterally spaced caster wheel which is neither driven, braked nor steered and is mounted laterally of the drive wheel, are mounted from the rear end of the truck.

In U.S. Pat. Nos. 3,080,019 and 3,163,250 the truck is driven from the operator's end by a pair of laterally spaced and independently driven dirigible and braked wheels.

In U.S. Pat. No. 3,280,933 a drive and idler wheel combination is disclosed in which the wheels are dirigible, the driven wheel being braked and the idler wheel not braked.

The present invention provides a significant improvement over all such prior constructions in the provision in such a truck of a pair of driven and idler wheels, both of which are braked.

This heretofore unknown combination of structure solves the prior problem of the inherent tendency of the truck to swerve upon brake application in which the brake is applied only to the one off-center drive-steer wheel, the latter wheel being in practice of substantially larger diameter than the idler wheel, while providing full driving capability at the one drive-steer wheel to maximize the space and reduce the cost as compared with dual drive wheeled trucks of prior types.

Preferably, our idler wheel is also a steer wheel coordinated through a steering linkage with the steering of the drive wheel by steering means such as is disclosed in U.S. Pat. No. 3,057,426, but, as above-mentioned, it may be a nondirigible caster wheel as disclosed in U.S. Pat. No. 2,564,002.

SUMMARY

A variety of combinations of the components involved in the steering, braking and driving of such trucks is available within the concept of the invention, the crux of which lies in the braking of both drive and idler wheels. The result is to substantially reduce the cost, and tend to maximize the packaging efficiency and the simplicity of the components thus combined in such trucks while producing balanced braking.

It is therefore a primary object of the invention to provide an improved brake system for certain types of lift trucks utilizing laterally spaced braked drive and idler wheels, both of which may be operator controlled dirigible wheels, or the idler wheel of which may be of a swiveling caster type.

Another object of the invention is to provide such a balanced braking effort in lift trucks of the type contemplated wherein off-center drive and idler wheels differ in diameter and in distance from the center line of the truck, that each brake is applied with a force as to produce braking without swerving.

A feature of the invention is to provide in a preferred embodiment hydraulic actuator means operative on an idler wheel of a lift truck, and mechanically actuated brake means operative on the drive wheel thereof.

An object of the invention is also to improve the efficiency of packaging of drive, wheel and brake components, and to reduce the cost of and improve the simplicity of trucks of the type contemplated.

BRIEF DESCRIPTION OF THE DRAWING

FIG. 3 is a schematic view of the preferred embodiment of the dual brake hereof;

FIG. 4 is an enlarged plan view of a part of FIG. 3;

FIG. 5 is a schematic view of a modified embodiment of the invention;

FIG. 6 is a schematic of yet another embodiment; and

FIG. 7 is a schematic view of the idler wheel showing a hydraulic connection thereto when it is mounted as a free-swiveling caster wheel.

DETAILED DESCRIPTION OF THE DRAWING

Figure 1:
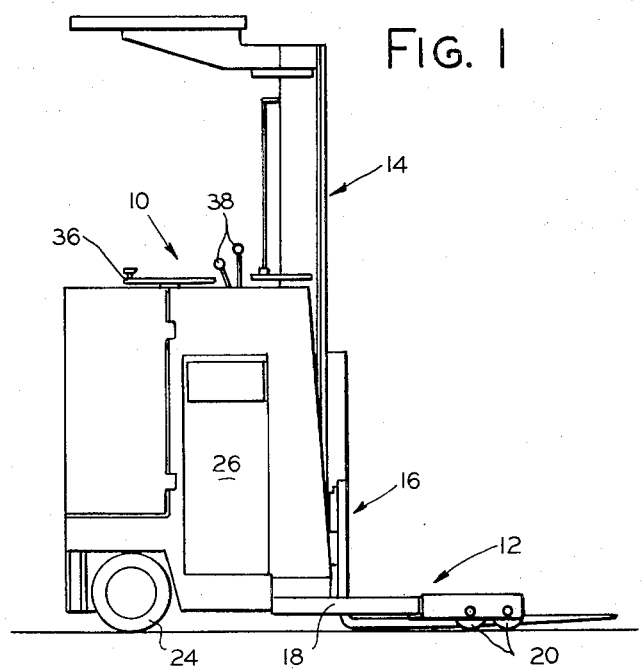
FIG. 1 is a side elevational view of a lift truck of a type which is well adapted for use with our invention.
Figure 2:
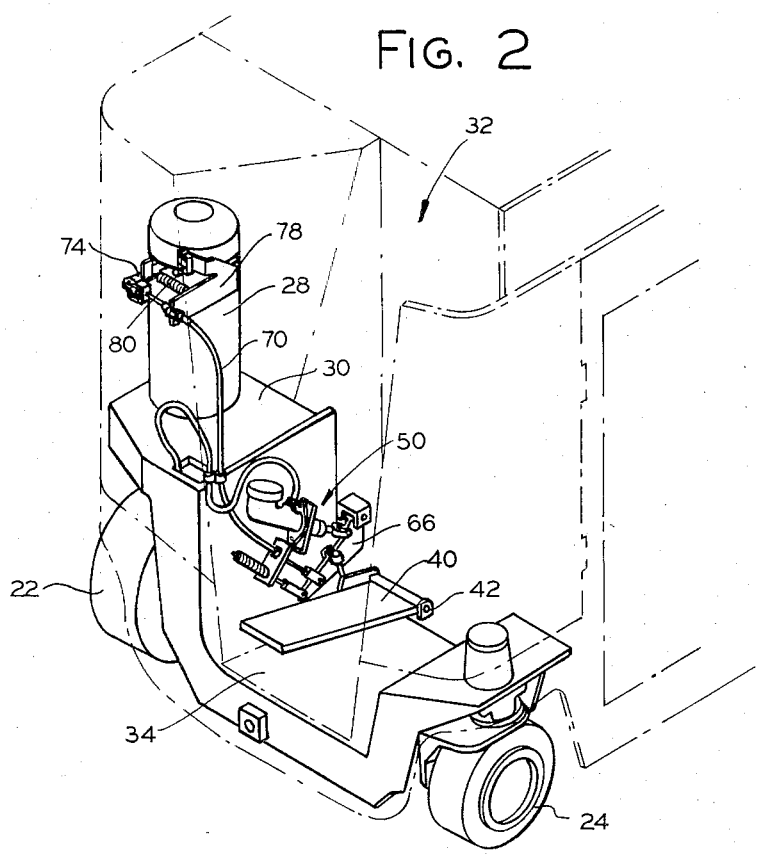
FIG. 2 is a partial phantom view in perspective showing an enlarged view of the rear portion of the truck of FIG. 1 and the arrangement of certain of the major components which are the subject matter hereof.

In FIGS. 1 and 2 there is illustrated an industrial truck having a power head or tractor unit 10 suitably coupled to a U-shaped load carrying frame 12, which together include a base frame of the truck. Mounted from the traction unit is an upright assembly 14 in which is supported for elevating movement a load carriage and fork mechanism 16. The truck is supported at the forward end of a pair of outrigger legs 18 by pairs of transversely spaced trail wheels 20, one pair of which is shown, and at the rear end by a pair of laterally spaced wheels, one of which is a drive-steer wheel 22 and the other of which is an idler wheel 24. A battery unit is shown at numeral 26 as an energy source for a drive motor 28 which is secured to a platform 30 of the truck frame and which is connected by a reduction gear drive, not shown, to traction wheel 22, the operator's station being located in a generally U-shaped area 32 formed by truck body members as shown in phantom view in FIG. 2, and including a platform 34 upon which the operator stands for operating the truck by means of a steering control wheel 36 and various controls as represented at numeral 38 for controlling the truck speed and operating the upright 14. Other controls are not shown, and the description to this point is of a general nature to orient the invention to the environment in which it is intended to function, and so further details of the lift truck need not be disclosed.

The idler wheel 24 is of smaller diameter than drive wheel 22 and may be mounted as either a swivel caster wheel or as a dirigible wheel, as explained above, the disclosure thereof in FIG. 2 being of a wheel adapted to be steered with wheel 22 by means of, for example, a steering linkage such as is disclosed in above-mentioned U.S. Pat. No. 3,057,426. A foot pedal 40 is pivotally mounted from a bracket 42 for releasing normally engaged brakes at wheels 22 and 24 when the operator is located in the compartment 32 with one foot placed upon pedal 40 to depress same into contact with platform 34, thereby operating the brake system to release the brakes at both wheels so that the lift truck may be operated.

A suitable fixed mounting for drive motor 28 and a transmission therefor with gear reduction to drive wheel 22 is also disclosed in prior mentioned U.S. Pat. No. 3,057,426, along with the steering linkage therein. It should be noted in this regard that while a fixed mounting of the drive motor is preferred, it is quite feasible to mount the motor on a rotatable support means for the drive wheel so that the motor rotates with the drive during dirigible movements thereof, such as is disclosed in above-mentioned U.S. Pat. No. 3,280,933. The particulars of the brake control mechanism shown at numeral 50 is as disclosed in the preferred embodiment of FIG. 3 hereof.

Referring now particularly to FIGS. 2–4, wheels 22 and 24 have been so indicated in FIG. 3, even though the wheels per se are not there shown. The foot pedal 40 is connected to a mechanically actuated brake which is operatively connected to a brake drum 52 in turn secured to rotate with a drive shaft 54 of the motor 28 to brake the drive wheel 22 through the gear reduction of the transmission thereof, a pair of brake shoes 56 being located in drum 52. A brake drum 58 is located inside the hub of idler wheel 24 which encloses brake shoes 60 and a hydraulic actuator 62. Both the mechanical actuator of the brake associated with motor shaft 54 at wheel 22 and the hydraulic actuator associated with the drum at wheel 24 are actuated by operator's pedal 40 through a link 64 and a lever 66 mounted pivotally from a bracket 68 which is supported from the truck frame, the lever being operatively connected to the brakes at both wheels.

The mechanical connection to brake shoes 56 comprises a Bowden type cable 68 housed partially in a conduit 70 and connected to lever 66 at 72 and to a clevis 76 pivotally connected to brake arm 74 at 76, the conduit 70 being secured to the truck at one end by a bracket member 78 and at the other end to a truck body mounted reaction plate 92. A brake compression spring 80 is connected to brake arm 74 at 82 and to bracket 78, and a compression spring 90 is mounted on reaction plate 92 by a rod 96 connected to the one end of lever 66 at 94 and to spring 90 by a retainer and nut 91. Well-known pivot and actuator camming means 84 and 86 are mounted inside the drum for operating brake shoes 56 to engage the brake drum 52 when lever 74 is actuated in a clockwise direction to the position shown with the foot pedal 40 raised. The brake is released when the foot pedal is depressed to actuate lever 74 in a counterclockwise direction by means of cable 68 compressing springs 80 and 90.

Spring 90 normally maintains the pedal 40 in a raised position and thereby allows spring 80 to maintain the brake engaged at wheel 22, while the brake and wheel 24 is normally engaged under such conditions by means of hydraulic piston actuator 62 pressurized by way of a master cylinder 98 actuated by lever 66 to depressurize actuator 62 through a conduit 100 in known manner. Hydraulic pressure in master cylinder 98 may be adjusted by adjusting nut 91 on spring 90.

As shown in FIG. 4, cable 68 has a one-way connection with clevis 76 so that the brake being normally engaged by the action of spring 80 causes cable 68, which is held in the position shown in FIG. 4 by the action of spring 90, to move out of engagement with clevis 76.

FIG. 7 illustrates as an alternative to the steered idler wheel 24 a well-known type of free-swiveling caster wheel assembly 24a adapted to be supported from the truck frame by a mounting plate 51 through which is connected to actuator cylinder 62 in the wheel 24a the hydraulic line 100 which extends through a hydraulic swivel joint 101, which may be of a type such as is manufactured by the Parker-Hannifin Hose Products Division of Wickliffe, Ohio. The hydraulic swivel joint, of course, allows 360° swivel action between the sections of hose 100 connected thereto during swiveling action of wheel 24a in either direction when the truck is being steered by drive-steer wheel 22. Thus, it is feasible to adapt our invention to either steered or caster supported idler wheels, although a steered idler wheel is preferred.

Referring now to FIG. 5, similar elements have been similarly numbered as prime numbers. In this embodiment the respective brake assemblies operative upon wheels 22 and 24 are the same as in FIG. 3. However, mechanical brake 56' is actuated to be disengaged by a hydraulic actuator 102 acting on a lever 104 against a tension spring 106 to disengage the brake, performing the same function as is performed in the previous embodiment by cable 68 when pedal 40 is depressed. A master cylinder 108 is connected by a ball joint connection to the one end of a double-acting lever 110 which is pivoted from a truck mounted bracket at 112. A conduit 113 conducts pressure fluid from 108 to 102 to disengage the brake, the second master cylinder 98' operating from the opposite end 114 of lever 110 to conduct pressure fluid by conduit 100' to actuator 62' to disengage the brake when pedal 40 is depressed, the pedal being connected to a third arm 116 of lever 110 by a link 118. A tension spring 120 maintains the master cylinders 98' and 108 in the positions illustrated with pedal 40' raised, the same as does compression spring 90 in the embodiment of FIG. 3.

Referring now to FIG. 6 elements similar to those shown both in FIGS. 3 and 5 have been similarly numbered as double prime numbers, and elements similar to those shown in FIG. 5 only have been similarly numbered as single prime numbers.

In this embodiment a master cylinder 132 is in communication with both hydraulic actuators 62" and 102'. A tension spring 130 maintains pedal 40" in its normal position in which both brakes are engaged by the action of master cylinder 132 pressurizing brake actuator 62" and depressurizing actuator 102' which permits spring 106' to engage brake 56". One-way check valves 134 and 136 are adapted to communicate the respective hydraulic components with a sump 138 to prevent cavitation in the event of hydraulic fluid leakage in the system. With the brakes engaged as shown spring 130 maintains braking pressure by way of master cylinder 132 in conduit 140 and actuator 62'', overcoming the return of said actuator in a manner similar to the action of spring 120 in FIG. 5 and spring 90 in FIG. 3. At the same time spring 106' actuates cylinder 102' as shown to release the pressure in that cylinder to the rod end of cylinder 132 by way of conduit 142 to maintain the mechanical brake engaged. Depression of pedal 40'' actuates the master cylinder to effect a flow of hydraulic fluid from actuator 62'' to the head end of cylinder 132 under the pressure generated by the brake return spring of actuator 62'', while actuating cylinder 102' against spring 106' by the pressure generated in the rod end of cylinder 132 to disengage brake 56''.

In practice, such trucks are designed with the single drive wheel 22 ordinarily closer to the center line of the truck than is the idler wheel 24, so that the drive wheel supports greater weight for traction and braking. Normally also the drive wheel is of substantially larger diameter than is the idler wheel. In a typical design the drive wheel brake provides about 60 percent of the braking effort and operates at relatively high speed and low torque because it is designed to brake the drive shaft of drive motor 28, operating through the gear train of the transmission, and therefore requiring less driver effort than if the brake was located in the wheel as in idler wheel 24. The idler wheel brake 60, on the other hand, operates at relatively low speed and high torque because it is located in the wheel and provides, in the above example, the remaining braking effort of approximately 40 percent. The division of braking effort between the two wheels, as 60–40 percent in the above example, is intended to produce smooth and even braking of the truck without swerving, and depends upon design factors such as the distribution of truck weight, the distance of each wheel from the center line, the relative size of each wheel, and the like.

Two types of brakes are used on the truck, i.e., a mechanical brake remote from the drive wheel and operative on the motor shaft, and a hydraulic brake inside of the idler wheel, primarily in order to provide a highly efficient means of "packaging" the components of the breaking system, minimizing the cost thereof, and utilizing the features above-described in respect of the various embodiments to substantially simplify the brake system over other means which may be devised to utilize braking both at the drive and idler wheels in such trucks.

It will be understood by those skilled in the art that modifications may be made in the structure, form, and relative arrangement of parts without necessarily departing from the spirit and scope of the invention. Accordingly, it should be understood that we intend to cover by the appended claims all such modifications which fall within the scope of our invention.

We claim:

1. In a power driven material handling truck having a base frame and wheels supporting the front end of the frame, a rear drive-steer wheel supported from the base frame on one side of the truck and spaced a first lateral distance from the center line thereof, a rear idler wheel supported from the base frame on the opposite side of the truck and spaced a second lateral distance from the center line thereof which is greater than the said first distance, said idler wheel being of smaller diameter than said drive-steer wheel, and brake means for braking both said rear mounted wheels comprising a brake external of said drive-steer wheel for braking said latter wheel, a brake internal of said idler wheel for braking said idler wheel, and single operator control means connected to both said external and internal brakes for engaging said brakes.

2. A power driven material handling truck as claimed in claim 1 wherein said idler wheel is a caster wheel swivel mounted on said frame.

3. A power driven material handling truck as claimed in claim 1 wherein said idler wheel is a dirigible wheel steered together with said drive-steer wheel.

4. A power driven material handling truck as claimed in claim 1 wherein said external brake operates at relatively high speed and low torque and said internal brake operates at relatively low speed and high torque.

5. A power driven material handling truck as claimed in claim 1 wherein said external brake provides greater braking force than is provided by said internal brake, said external and internal brakes cooperating to produce a substantially equal braking effort in relation to the complete truck such that braking of the truck produces no substantial tendency thereof to swerve.

6. A power driven material handling truck as claimed in claim 4 wherein said external brake provides greater braking force than is provided by said internal brake, said external and internal brakes cooperating to produce a substantially equal braking effort in relation to the complete truck such that braking of the truck produces no substantial tendency thereof to swerve.

7. A power driven material handling truck as claimed in claim 1 wherein said external brake is mechanically actuated and said internal brake is hydraulically actuated.

8. A power driven material handling truck as claimed in claim 7 wherein said operator control means is operatively connected to said brake means to cause said brake means to be normally engaged, actuation of said operator control means releasing said brake means.

9. A power driven material handling truck as claimed in claim 8 wherein said operative connection to said brake means includes primary lever means, a mechanical actuator connecting said lever means to said external brake and a master cylinder connecting said lever means to said internal brake.

10. A power driven material handling truck as claimed in claim 8 wherein said operative connection to said brake means includes primary lever means, master cylinder means connecting said lever means to both said external and internal brakes and secondary lever means operated by said master cylinder for actuating mechanically said external brake.

* * * * *